(12) United States Patent
Wei et al.

(10) Patent No.: US 11,686,288 B2
(45) Date of Patent: Jun. 27, 2023

(54) METHOD, DEVICE AND SYSTEM FOR CORRECTING INSTALLATION ERRORS OF WIND VANE

(71) Applicant: BEIJING GOLDWIND SCIENCE & CREATION WINDPOWER EQUIPMENT CO., LTD., Beijing (CN)

(72) Inventors: Meng Wei, Beijing (CN); Boyu Yang, Beijing (CN); Amin Ye, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 513 days.

(21) Appl. No.: 17/043,461

(22) PCT Filed: Nov. 29, 2019

(86) PCT No.: PCT/CN2019/121870
§ 371 (c)(1),
(2) Date: Sep. 29, 2020

(87) PCT Pub. No.: WO2020/108598
PCT Pub. Date: Jun. 4, 2020

(65) Prior Publication Data
US 2021/0115899 A1     Apr. 22, 2021

(30) Foreign Application Priority Data

Nov. 29, 2018  (CN) .................. 201811442050.X
Nov. 7, 2019   (CN) .................... 201911082745.6

(51) Int. Cl.
*F03D 7/04*    (2006.01)
*G06T 7/73*    (2017.01)
(Continued)

(52) U.S. Cl.
CPC .......... *F03D 7/047* (2013.01); *F03D 7/0204* (2013.01); *G01P 13/02* (2013.01); *G01P 21/00* (2013.01);
(Continued)

(58) Field of Classification Search
CPC combination set(s) only.
See application file for complete search history.

(56) References Cited

U.S. PATENT DOCUMENTS 7,550,862 B2   6/2009  Altemark
8,261,599 B2 * 9/2012  Jeffrey .................. G01H 1/006
                                                    73/66
(Continued)

FOREIGN PATENT DOCUMENTS

CN    201348637 Y    11/2009
CN    103982379 A    8/2014
(Continued)

OTHER PUBLICATIONS

First Examination Report in corresponding Indian Application No. 202017046100 dated Aug. 10, 2021 (6 pages).
(Continued)

*Primary Examiner* — Binh Q Tran
(74) *Attorney, Agent, or Firm* — Bayes PLLC

(57) ABSTRACT

Methods, apparatuses, and systems for collecting the installation error of the wind vane are provided. The image of the blades of the wind turbine and the outer rotor of the generator is obtained. It is determined whether the wind vane is aligned with the center line of the wind turbine, according to a relationship between the center line of the wind turbine and the orienting plane of the wind vane in the image. In a case that the wind vane is not aligned with the center line of the wind turbine, the deviation angle between the wind vane and the center line of the wind turbine is
(Continued)

calculated, and a direction of the wind vane is corrected according to the deviation angle. Therefore, installation errors of the wind vane are accurately determined and corrected, and accuracy is improved for installation of the wind vane.

20 Claims, 6 Drawing Sheets

(51) Int. Cl.
  *G06T 7/13*    (2017.01)
  *F03D 7/02*    (2006.01)
  *G01P 13/02*   (2006.01)
  *G01P 21/00*   (2006.01)
  *G06T 5/00*    (2006.01)
  *G06T 7/00*    (2017.01)

(52) U.S. Cl.
  CPC ............ *G06T 5/002* (2013.01); *G06T 7/0004* (2013.01); *G06T 7/13* (2017.01); *G06T 7/73* (2017.01); *F05D 2270/8041* (2013.01); *G06T 2207/30164* (2013.01)

(56) References Cited

U.S. PATENT DOCUMENTS

| | | | | |
|---|---|---|---|---|
| 9,512,819 B2* | 12/2016 | Bunge | ................ | F03D 13/20 |
| 2011/0135466 A1* | 6/2011 | Latorre | ................ | F03D 17/00 |
| | | | | 416/61 |
| 2014/0054476 A1* | 2/2014 | Zheng | ................ | F03D 17/00 |
| | | | | 250/578.1 |
| 2018/0149138 A1 | 5/2018 | Thiercelin et al. | | |
| 2019/0072082 A1* | 3/2019 | Lysgaard | ................ | F03D 7/042 |
| 2021/0246871 A1* | 8/2021 | Fu | ................ | F03D 7/024 |
| 2022/0003212 A1* | 1/2022 | Li | ................ | H04N 7/18 |
| 2022/0074386 A1* | 3/2022 | Nielsen | ................ | F03D 7/024 |

FOREIGN PATENT DOCUMENTS

| | | |
|---|---|---|
| CN | 105114258 A | 12/2015 |
| CN | 105134495 A | 12/2015 |
| CN | 205237496 U | 5/2016 |
| CN | 207064155 U | 3/2018 |
| CN | 108303005 A | 7/2018 |
| CN | 207779275 U | 8/2018 |
| GB | 1511948 A | 5/1978 |
| WO | 2011051778 A1 | 5/2011 |

OTHER PUBLICATIONS

European Search Report in corresponding European Application No. 19889545.0 dated Jun. 14, 2021 (7 pages).

Martin Stokkeland: "A Computer Vision Approach for Autonomous Wind Turbine Inspection using a Multicopter", Master of Science in Cybernetics and Robotics, Jun. 17, 2014 (124 pages).

International Search Report and Written Opinion issued in corresponding PCT Application No. PCT/CN2019/121870, dated Feb. 14, 2020, 12 pages.

* cited by examiner

METHOD, DEVICE AND SYSTEM FOR CORRECTING INSTALLATION ERRORS OF WIND VANE

CROSS-REFERENCE TO RELATED APPLICATIONS

The present disclosure is the national phase of International Application No. PCT/CN2019/121870, titled "METHOD, DEVICE AND SYSTEM FOR CORRECTING INSTALLATION ERRORS OF WIND VANE," filed on Nov. 29, 2019, which claims priority to Chinese Patent Application No. 201811442050.X, titled "METHOD AND APPARATUS FOR CORRECTING INSTALLATION ERROR OF WIND VANE", filed on Nov. 29, 2018 with the China National Intellectual Property Administration, and Chinese Patent Application No. 201911082745.6, titled "METHOD, APPARATUS AND SYSTEM FOR CORRECTING INSTALLATION ERROR OF WIND VANE", filed on Nov. 7, 2019 with the China National Intellectual Property Administration. The entire contents of each of the above-identified applications are expressly incorporated herein by reference.

The present disclosure claims priority to Chinese Patent Application No. 201811442050.X, titled "METHOD AND APPARATUS FOR CORRECTING INSTALLATION ERROR OF WIND VANE", filed on Nov. 29, 2018 with the China National Intellectual Property Administration, and Chinese Patent Application No. 201911082745.6, titled "METHOD, APPARATUS AND SYSTEM FOR CORRECTING INSTALLATION ERROR OF WIND VANE", filed on Nov. 7, 2019 with the China National Intellectual Property Administration, which are incorporated herein by reference in their entireties.

TECHNICAL FIELD

The present disclosure relates to the field of wind power generation, and in particular, to a method, an apparatus and a system for correcting an installation error of a wind vane.

BACKGROUND

A yaw system is an important part of a wind turbine. The yaw system is capable to achieve fast and smooth wind alignment when the wind direction changes, so that a wind wheel can acquire maximum wind energy. A wind vane serves as a front-end input in a yaw strategy for wind alignment. A deviation in detecting the wind direction by the wind vane would result in a power loss of the wind turbine and an increase in a load of the wind turbine.

At present, the wind vane of the wind turbine is generally installed on top of a nacelle, and the installation is manually performed. A direction of the wind vane is adjusted by a staff, in order to align a marking "S" on a rotating shaft of the wind vane with a head of the wind turbine, or align a marking "N" with a tail of the wind turbine. Then, the rotating shaft of the wind vane is fixed on top of the nacelle. In such case, there is an absolute error angle between the direction of the wind vane and a center line of the wind turbine, and the wind wheel is not exactly aligned with the wind direction due to the absolute error angle.

SUMMARY

A method, an apparatus and a system for correcting an installation error of a wind vane is provided according to embodiments of the present disclosure, so as to achieve automatic correction of installation errors of wind vanes and improve accuracy of installation of wind vanes.

A method for correcting an installation error of a wind vane is provided according to an embodiment of the present disclosure, including: obtaining an image, of blades of a wind turbine and an outer rotor of a generator; obtaining a contour of the blades of the wind turbine and a contour of the outer rotor of the generator, from the image of the blades of the wind turbine and the outer rotor of the generator; calculating a center line of the wind turbine, according to the contour of the outer rotor of the generator and a contour of two blades in the blades of the wind turbine; obtaining an intersection point between the center line of the wind turbine and the contour of the outer rotor of the generator, as a first intersection point; obtaining an orienting plane of the wind vane; determining whether the wind vane is aligned with the center line of the wind turbine, according to the center line of the wind turbine and the orienting plane of the wind vane; and in a case that the wind vane is not aligned with the center line of the wind turbine, calculating a deviation angle between the wind vane and the center line of the wind turbine based on the orienting plane of the wind vane and the first intersection point, and correcting a direction of the wind vane according to the deviation angle between the wind vane and the center line of the wind turbine.

In an optional embodiment, obtaining the contour of the blades of the wind turbine and the contour of the outer rotor of the generator from the image of the blades of the wind turbine and the outer rotor of the generator includes: obtaining a grayscale image of the blades of the wind turbine and the outer rotor of the generator, according to the image of the blades of the wind turbine and the outer rotor of the generator; performing edge detection on the grayscale image; and performing contour detection on the grayscale image, according to a result of the edge detection.

In an optional embodiment, performing the edge detection on the grayscale image of the blades of the wind turbine and the outer rotor of the generator includes: denoising the grayscale image of the blades of the wind turbine and the outer rotor of the generator, through a Gaussian filter; calculating gradient magnitude of a grayscale of each pixel in the grayscale image after the de-noising; performing preset enhancement on the grayscale of each pixel, according to the gradient magnitude; and determining an edge pixel of the blades of the wind turbine and the outer rotor of the generator, according to a relationship between the enhanced grayscale and a preset threshold.

In an optional embodiment, obtaining the orienting plane of the wind vane includes: obtaining a result of laser orientation on the wind vane; and determining the orienting plane of the wind vane according to the result of the laser orientation.

In an optional embodiment, calculating the center line of the wind turbine includes: extending edge lines in the contour of the two blades of the wind turbine, to obtain an intersection point between the extended edge lines; and connecting the intersection point between the extended edge lines, and a center point of the contour of the outer rotor of the generator, to obtain the center line of the wind turbine.

In an optional embodiment, calculating the deviation angle between the wind vane and the center line of the wind turbine based on the orienting plane of the wind vane and the first intersection point includes: obtaining an intersection point between the orienting plane of the wind vane and the contour of the outer rotor of the generator, as a second intersection; calculating a quantity of pixels, which are between the first intersection point and the second intersection point, in the image of the blades of the wind turbine and the outer rotor of the generator, where the image is obtained by an image collecting apparatus fixed on the wind vane, and the image collecting apparatus is fixed at a head of the wind vane; calculating a distance represented by each pixel in the image, according to a width of a view field of the image collecting apparatus and a quantity of pixels along a width direction of the image; calculating a deviation distance, between the wind vane and the center line of the wind turbine, corresponding to each angle degree of the deviation angle, according to a distance between the image collecting apparatus and the outer rotor of the generator, where the distance between the image collecting apparatus and the outer rotor of the generator is obtained through ultrasonic distance measurement; and calculating the deviation angle between the wind vane and the center line of the wind turbine, according to the distance represented by each pixel in the image and the deviation distance corresponding to each angle degree.

A apparatus for correcting an installation error of a wind vane is provided according to an embodiment of the present disclosure, including: an image obtaining module, configured to obtain an image, of blades of a wind turbine and an outer rotor of a generator; a contour obtaining module, configured to obtain a contour of the blades of the wind turbine and a contour of the outer rotor of the generator, from the image of the blades of the wind turbine and the outer rotor of the generator; a center line calculation module, configured to calculate a center line of a wind turbine, according to the contour of the outer rotor of the generator and a contour of two blades in the blades of the wind turbine; a first intersection point obtaining module, configured to obtain an intersection point between the center line of the wind turbine and the contour of the outer rotor of the generator, as a first intersection point; an alignment determination module, configured to obtain an orienting plane of the wind vane, and determine whether the wind vane is aligned with the center line of the wind turbine, according to the center line of the wind turbine and the orienting plane of the wind vane; and an angle correction module, configured to determine that the wind vane is not aligned with the center line of the wind turbine, calculate a deviation angle between the wind vane and the center line of the wind turbine based on the orienting plane of the wind vane and the first intersection point, and correct a direction of the wind vane according to the deviation angle between the wind vane and the center line of the wind turbine.

In an optional embodiment, the contour obtaining module is configured to: obtain a grayscale image of the blades of the wind turbine and the outer rotor of the generator, according to the image of the blades of the wind turbine and the outer rotor of the generator; perform edge detection on the grayscale image; and perform contour detection on the gray scale image, according to a result of the edge detection.

In an optional embodiment, the contour obtaining module is configured to: denoise the grayscale image of the blades of the wind turbine and the outer rotor of the generator, through a Gaussian filter; calculate gradient magnitude of a grayscale of each pixel in the grayscale image after the de-noising; perform preset enhancement on the grayscale of each pixel, according to the gradient magnitude; and determine an edge pixel of the blades of the wind turbine and the outer rotor of the generator, according to a relationship between the enhanced grayscale and a preset threshold.

In an optional embodiment, the alignment determination module is configured to: obtain a result of laser orientation on the wind vane, and determine the orienting plane of the wind vane according to the result of the laser orientation.

In an optional embodiment, the center line calculation module is configured to: extend edge lines in the contour of the two blades of the wind turbine, to obtain an intersection point between the extended edge lines; and connect the intersection point between the extended edge lines, and a center point of the contour of the outer rotor of the generator, to obtain the center line of the wind turbine.

In an optional embodiment, the angle correction module is configured to: obtain an intersection point between the orienting plane of the wind vane and the contour of the outer rotor of the generator, as a second intersection; calculate a quantity of pixels, which are between the first intersection point and the second intersection point, in the image of the blades of the wind turbine and the outer rotor of the generator, where the image is obtained by an image collecting apparatus fixed on the wind vane, and the image collecting apparatus is fixed at a head of the wind vane; calculate a distance represented by each pixel in the image, according to a width of a view field of the image collecting apparatus and a quantity of pixels along a width direction of the image; calculate a deviation distance, between the wind vane and the center line of the wind turbine, corresponding to each angle degree of the deviation angle, according to a distance between the image collecting apparatus and the outer rotor of the generator, where the distance between the image collecting apparatus and the outer rotor of the generator is obtained through ultrasonic distance measurement; and calculate the deviation angle between the wind vane and the center line of the wind turbine, according to the distance represented by each pixel in the image and the deviation distance corresponding to each angle degree.

A computer-readable storage medium is provided according to an embodiment of the present disclosure, storing a computer program, where the computer program when executed implements the aforementioned method for correcting the installation error of the wind vane.

A computing apparatus is provided according to an embodiment of the present disclosure, including a memory, a processor, and a computer program stored in the memory and executable by the processor, where the processor when executing the computer program implements the aforementioned method for correcting the installation error of the wind vane.

A system for correcting an installation error of a wind vane of a wind turbine is provided according to an embodiment of the present disclosure, wherein the wind turbine includes a nacelle, a wheel hub, a generator, and a wind vane, the wheel hub includes three blades, the generator is disposed between the nacelle and the wheel hub, the wind vane is disposed on top of the nacelle, and a head of the wind vane points toward the wheel hub;

wherein the system includes:
  an image collecting apparatus, detachably disposed at the head of the wind vane, wherein the image collecting apparatus is configured to acquire an image of blades of the wind turbine and an outer rotor of the generator; and
  a processor, in communications connection with the image collecting apparatus;
wherein the processor is configured to:
  obtain the image of blades of the wind turbine and the outer rotor of the generator;

obtain a contour of the blades of the wind turbine and a contour of the outer rotor of the generator, from the image of the blades of the wind turbine and the outer rotor of the generator;

calculate a center line of a wind turbine, according to the contour of the outer rotor of the generator and a contour of two blades in the blades of the wind turbine;

obtain an intersection point between the center line of the wind turbine and the contour of the outer rotor of the generator, as a first intersection point;

obtain an orienting plane of the wind vane, and determine whether the wind vane is aligned with the center line of the wind turbine, according to the center line of the wind turbine and the orienting plane of the wind vane; and determine that the wind vane is not aligned with the center line of the wind turbine, calculate a deviation angle between the wind vane and the center line of the wind turbine based on the orienting plane of the wind vane and the first intersection point, and correct a direction of the wind vane according to the deviation angle between the wind vane and the center line of the wind turbine.

In an optional embodiment, the processor is further configured to:

obtain a grayscale image of the blades of the wind turbine and the outer rotor of the generator, according to the image of the blades of the wind turbine and the outer rotor of the generator; perform edge detection on the grayscale image; and perform contour detection on the grayscale image, according to a result of the edge detection.

In an optional embodiment, the processor is further configured to:

denoise the grayscale image of the blades of the wind turbine and the outer rotor of the generator, through a Gaussian filter;

calculate gradient magnitude of a grayscale of each pixel in the grayscale image after the de-noising;

perform preset enhancement on the grayscale of each pixel, according to the gradient magnitude; and determine an edge pixel of the blades of the wind turbine and the outer rotor of the generator, according to a relationship between the enhanced grayscale and a preset threshold.

In an optional embodiment, the system further includes a laser scanning apparatus, wherein the laser scanning apparatus is configured to: scan the wind vane and a rotating shaft, and collect data of the orienting plane of the wind vane;

where the processor is further configured to:

obtain a result of laser orientation on the wind vane, and determine the orienting plane of the wind vane according to the result of the laser orientation.

In an optional embodiment, the processor is further configured to:

extend edge lines in the contour of the two blades of the wind turbine, to obtain an intersection point between the extended edge lines; and connect the intersection point between the extended edge lines, and a center point of the contour of the outer rotor of the generator, to obtain the center line of the wind turbine.

In an optional embodiment, the processor is further configured to:

obtain an intersection point between the orienting plane of the wind vane and the contour of the outer rotor of the generator, as a second intersection;

calculate a quantity of pixels, which are between the first intersection point and the second intersection point, in the image of the blades of the wind turbine and the outer rotor of the generator, where the image is obtained by the image collecting apparatus fixed on the wind vane;

calculate a distance represented by each pixel in the image, according to a width of a view field of the image collecting apparatus and a quantity of pixels along a width direction of the image;

calculate a deviation distance, between the wind vane and the center line of the wind turbine, corresponding to each angle degree of the deviation angle, according to a distance between the image collecting apparatus and the outer rotor of the generator, where the distance between the image collecting apparatus and the outer rotor of the generator is obtained through ultrasonic distance measurement; and calculate the deviation angle between the wind vane and the center line of the wind turbine, according to the distance represented by each pixel in the image and the deviation distance corresponding to each angle degree.

The method, the apparatus, and the system for collecting the installation error of the wind vane are provided according to embodiments of the present disclosure. The image of the blades of the wind turbine and the outer rotor of the generator is obtained. It is determined whether the wind vane is aligned with the center line of the wind turbine, according to a relationship between the center line of the wind turbine and the orienting plane of the wind vane in the image. In a case that the wind vane is not aligned with the center line of the wind turbine, the deviation angle between the wind vane and the center line of the wind turbine is calculated, and a direction of the wind vane is corrected according to the deviation angle between the wind vane and the center line of the wind turbine. Therefore, installation errors of the wind vane are accurately determined and corrected, and accuracy is improved for installation of the wind vane.

BRIEF DESCRIPTION OF THE DRAWINGS

Hereinafter embodiments are described in conjunction with drawings, such that the above and other objectives and features of embodiments of the present disclosure are clearer.

DETAILED DESCRIPTION

Figure 1:
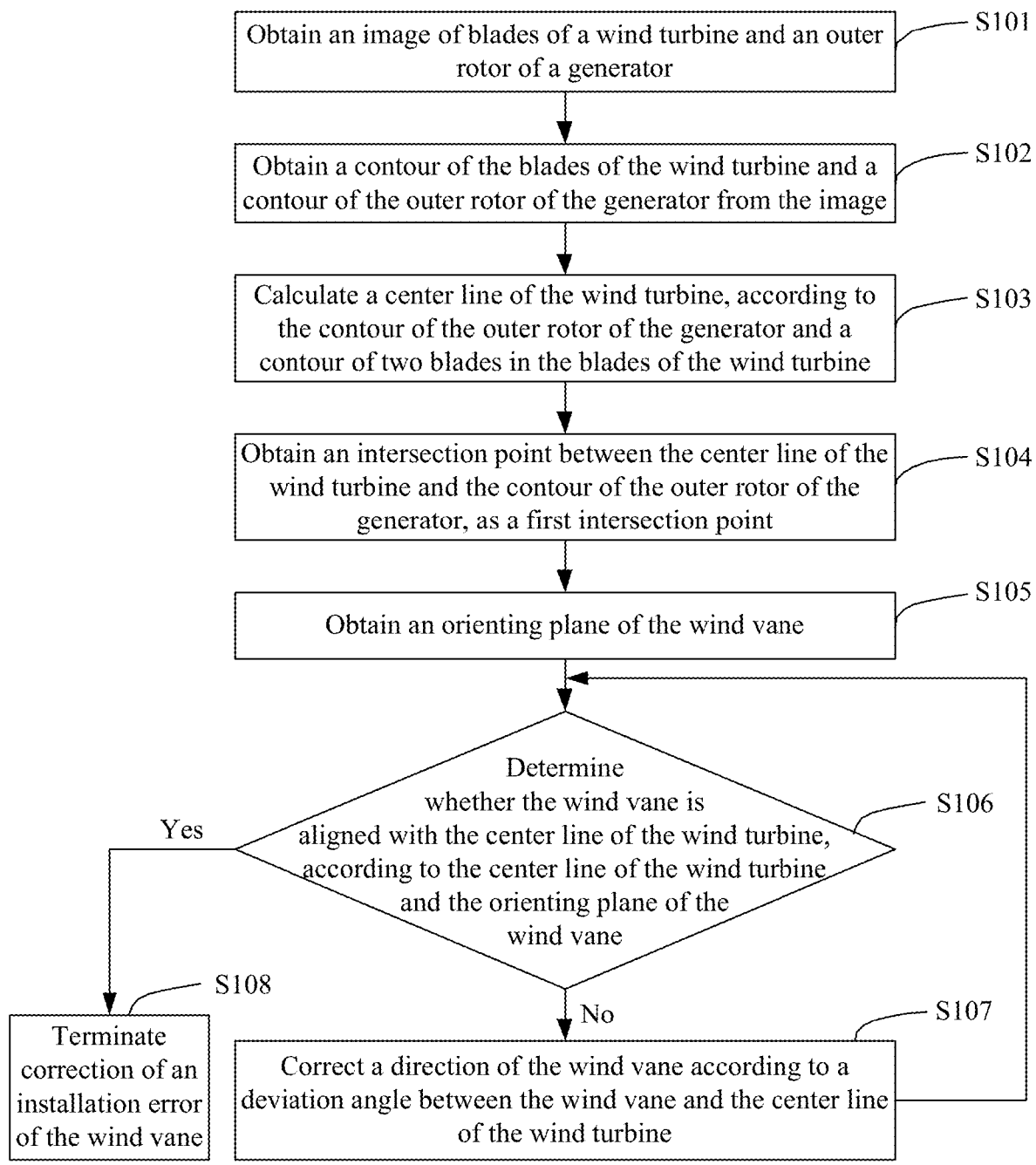
FIG. 1 is a flow chart of a method for correcting an installation error of a wind vane according to an embodiment of the present disclosure.

Hereinafter detailed reference is made to embodiments of the present disclosure, examples of which are shown in the drawings. Same reference numerals refer to same components. Hereinafter embodiments are described in conjunction with the drawings to explain the present disclosure.

Embodiments of the present disclosure are applicable to the field of wind power generation, and in particular, to an apparatus or a system for correcting an installation error of a wind vane.

Figure 6:
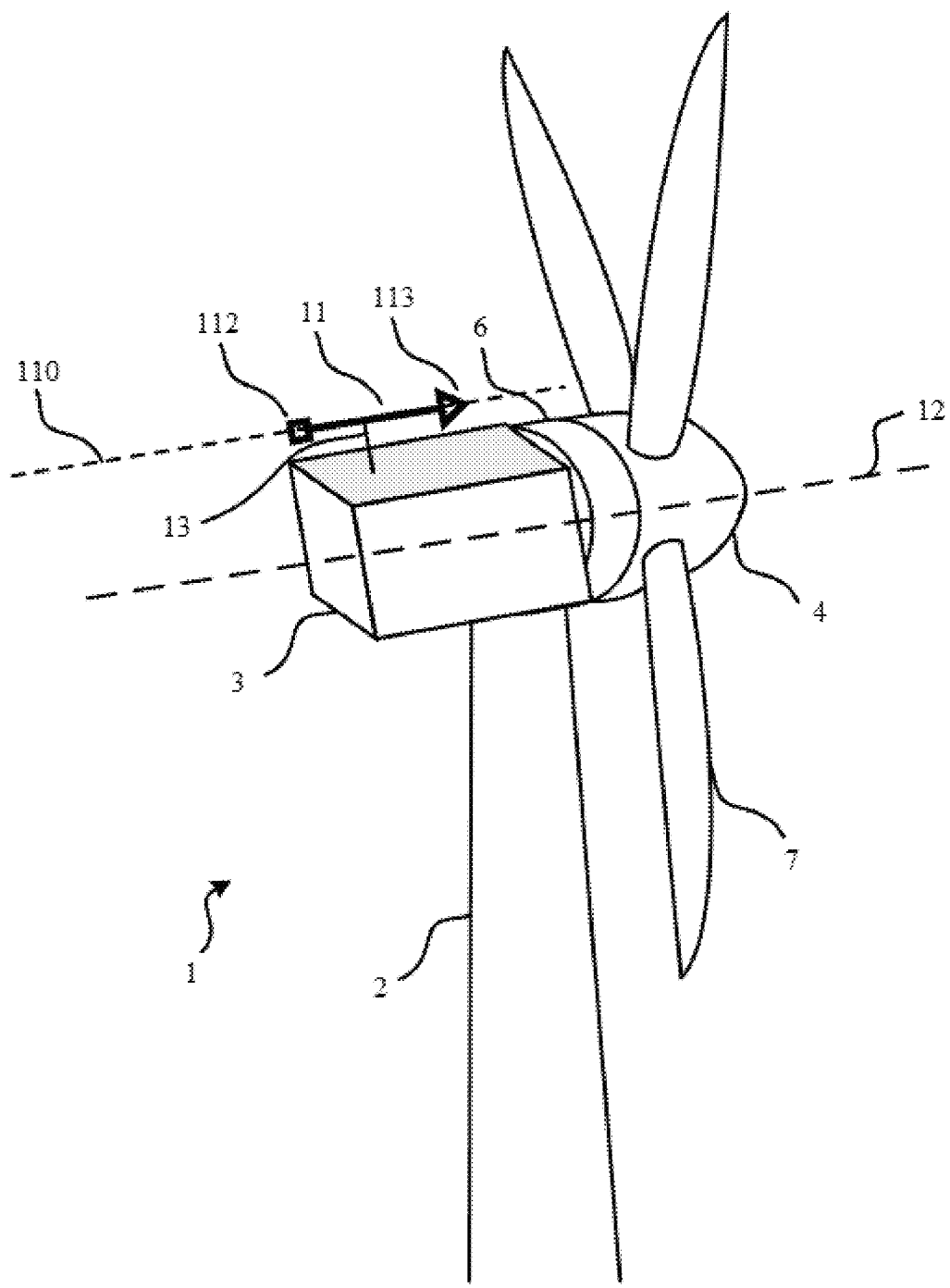
FIG. 6 is a schematic diagram of a wind turbine according to an embodiment of the present disclosure.

FIG. 6 shows a wind turbine 1 according to an embodiment of the present disclosure. The wind turbine 1 includes a tower 2, a nacelle 3, a wheel hub 4, a generator 6 and a wind vane 11. The nacelle 3 is arranged on top of the tower 2, and the wheel hub 4 includes three blades 7. The generator 6 is disposed between the nacelle 3 and the wheel hub 4. The wind vane 11 is disposed on top of the nacelle 3. The wind vane 11 detects a wind direction, and the nacelle 3 yaws according to the wind direction to adjust a direction of wind alignment. There is a center line 12 of the wind turbine 1.

The wind vane 11 is rotatably connected with a top of the nacelle 3 via a rotating shaft 13. The wind vane 11 is a structure in a shape of a long-strip, and has a head 113 and a tail 112. The wind vane 11 is rotatable with respect to the rotating shaft 13. The wind vane 11 has a central axis 110, and the central axis 110 and the rotating shaft 13 define an orienting plane 92 of the wind vane.

An installation error of the wind vane refers to an angle 114 between the center axis 110 of the wind vane 11 and the center line 12 of the wind turbine, when an operator installs the wind vane by arranging the head 113 toward the wheel hub 4 and arranging the tail 112 toward the nacelle 3 and away from the wheel hub 4.

Figure 7:
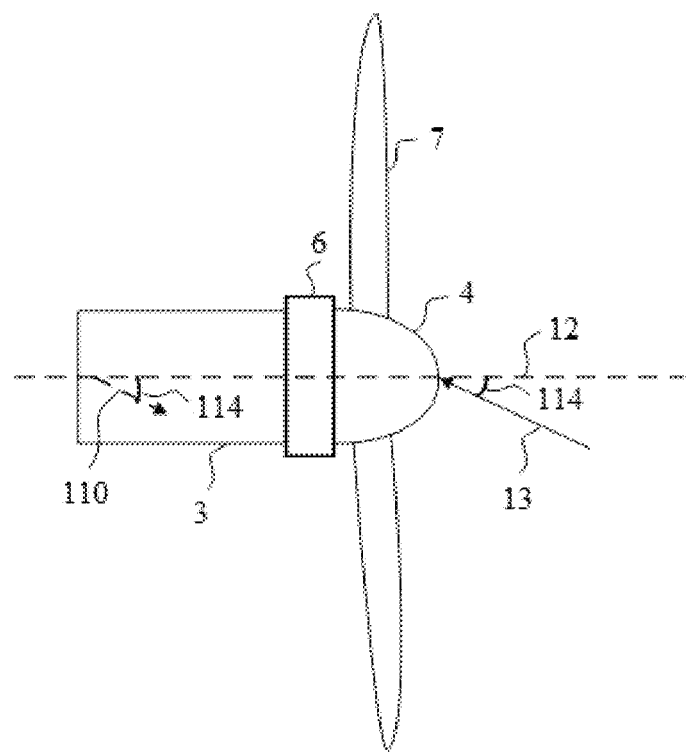
FIG. 7 is a top view of a wind turbine according to an embodiment of the present disclosure.

As shown in FIG. 7, the central axis 110 of the wind vane 11 is parallel to the center line 12 of the wind turbine under an ideal condition, and thereby the wind vane 11 can recognize a wind direction accurately. Due to an error in installation, there is the angle 114 between the center axis 110 of the wind vane 11 and the center line 12 of the wind turbine. The angle 114 is an absolute error angle in yawing, resulting in that the nacelle 3 cannot be aligned with an actual wind direction 13.

The wind vane 11 may be a mechanical wind vane or an ultrasonic wind vane.

Figure 8:
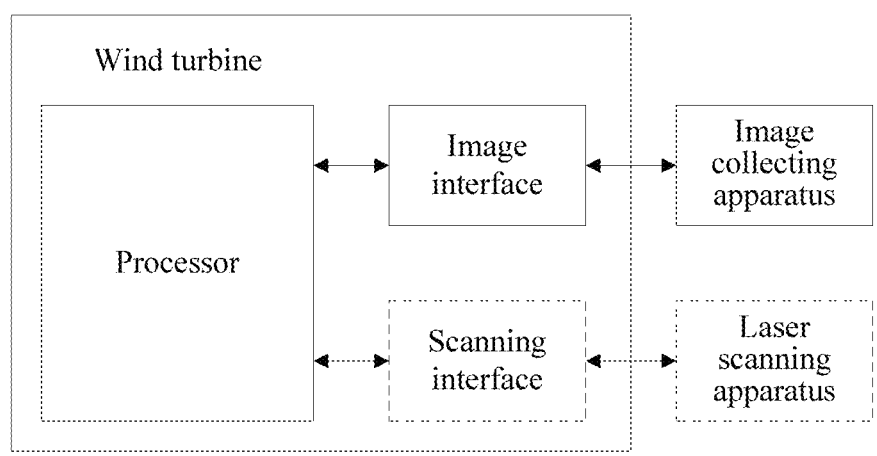
FIG. 8 is a schematic diagram of a system for correcting an installation error of a wind vane according to an embodiment of the present disclosure.

A system for correcting an installation error of a wind vane of a wind turbine is provided according to an embodiment of the present disclosure. Referring to FIG. 8, the system includes an image collecting apparatus and a processor. The image collecting apparatus is detachably arranged at a head 113 of the wind vane, and is configured to acquire an image of blades of the wind turbine 7 and a generator 6. The processor is connected to the image collecting apparatus in communications via an image interface, and receives image data of the blades of the wind turbine and the generator collected by the image collecting apparatus.

The image collecting apparatus may be a video camera or a camera.

The system further includes a laser scanning apparatus. The laser scanning apparatus is configured to scan the wind vane 11 and a rotating shaft 13, so as to collect data of the orienting plane of the wind vane. The data of the orienting plane of the wind vane is determined by the laser scanning apparatus and inputted into the processor. The processor may be connected to the laser scanning apparatus via a scanning interface, and the scanning interface is configured to receive the data of the orienting plane of the wind vane generated by the laser scanning apparatus.

The processor is configured to implement a flow of a method for correcting an installation error of a wind vane as shown in FIG. 1.

FIG. 1 is a flow chart of a method for correcting an installation error of a wind vane according to an embodiment of the present disclosure.

Reference is made to FIG. 1. In step S101, an image of blades of the wind turbine and an outer rotor of a generator is obtained.

In an embodiment of the present disclosure, the image of the blades of the wind turbine and the outer rotor of the generator may be acquired by an image collecting apparatus fixed on the wind vane. The image collecting apparatus may be fixed at a head of the wind vane. The image of the blades of the wind turbine and the outer rotor of the generator acquired by the image collecting apparatus at least includes a part of at least two blades in the blades of the wind turbine and a part of the outer rotor of the generator outer. For example, the image includes two blades in the blades of the wind turbine and an upper half of the outer rotor of the generator, or a part of the two blades and a part of the outer rotor of the generator that is close to the two blades.

In step S102, a contour of the blades of the wind turbine and a contour of the outer rotor of the generator are obtained from the image of the blades of the wind turbine and the outer rotor of the generator.

The image of the blades of the wind turbine and the outer rotor of the generator acquired by the image collecting apparatus may contain unwanted background interference information, such as sky and trees. Embodiments of the present disclosure focus mainly on the blades of the wind turbine and the outer rotor of the generator. Therefore, an originally acquired image of the blades of the wind turbine and the outer rotor of the generator should be processed to extract a target object that is to be measured, that is, the blades of the wind turbine and the outer rotor of the generator.

Figure 2:
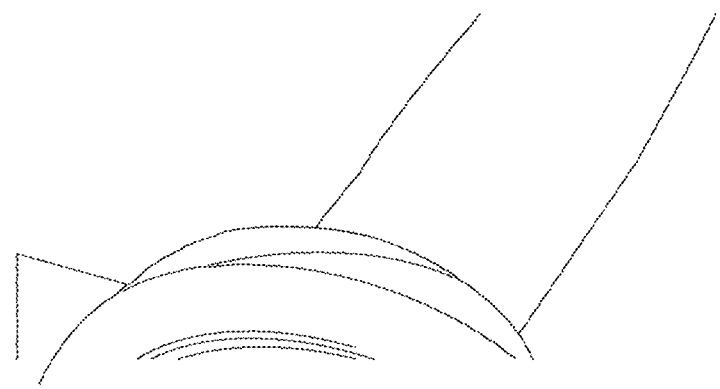
FIG. 2 is a schematic diagram of a contour detection result of an image of blades of the wind turbine and an outer rotor of a generator acquired by a camera according to an embodiment of the present disclosure.

In an embodiment of the present disclosure, following steps may be performed when obtaining the contour of the blades of the wind turbine and the contour of the outer rotor of the generator from the image of the blades of the wind turbine and the outer rotor of the generator. First, a grayscale image of the blades of the wind turbine and the outer rotor of the generator is obtained according to the image of the blades of the wind turbine and the outer rotor of the generator. Edge detection is performed on the gray scale image of the blades of the wind turbine and the outer rotor of the generator. Then, contour detection is performed on the grayscale image of the blades of the wind turbine and the outer rotor of the generator, according to a result of the edge detection, so as to obtain the contour of the blades of the wind turbine and the contour of the outer rotor of the generator. Reference is made to FIG. 2, which is a schematic diagram of a contour detection result of an image of blades of the wind turbine and an outer rotor of a generator acquired by a camera according to an embodiment of the present disclosure. FIG. 2 shows a partial contour of two blades in the blades of the wind turbine, and a partial contour of the outer rotor of the generator that is close to the two blades.

In an embodiment of the present disclosure, the edge detection may be performed based on a first derivative (or gradient magnitude) and a second derivative (or gradient magnitude) of grayscales of pixels in the grayscale image. Generally, the derivatives (or the gradient magnitudes) are sensitive to noise, which reduces accuracy of the result of the edge detection.

Therefore, following steps may be performed in an embodiment of the present disclosure, when performing edge detection on the grayscale image of the blades of the wind turbine and the outer rotor of the generator. First, the grayscale image of the blades of the wind turbine and the outer rotor of the generator may be denoised through a Gaussian filter. Gradient magnitude of a grayscale of each pixel in the grayscale image is calculated after the denoising. Then, preset enhancement is performed on the grayscale of each pixel according to the gradient magnitude, so as to highlight pixels at which grayscale changes significantly in vicinity. Finally, an edge pixel of the blades of the wind turbine and the outer rotor of the generator is determined according to a relationship between the enhanced grayscale and a preset threshold.

In an embodiment of the present disclosure, when denoising the grayscale image of the blades of the wind turbine and the outer rotor of the generator through the Gaussian filter, a discretized Gaussian function may be first used to generate a set of normalized Gaussian kernels, and then weighted sum is performed on all points of an image gray matrix based on a Gaussian kernel function.

In an embodiment of the present disclosure, when calculating the gradient magnitude of the grayscale of each pixel in the grayscale image, the gradient magnitude and a gradient direction may be calculated according to following equations:

$$G = \sqrt{G_x^2 + G_y^2}$$
$$\theta = \arctan\left(\frac{G_y}{G_x}\right),$$

where G represents the gradient magnitude, θ represents the gradient direction, $G_x$ represents gradient magnitude in the x direction, and $G_y$ represents gradient magnitude in the y direction.

In an embodiment of the present disclosure, following steps may be performed when determining the edge pixel of the blades of the wind turbine and the outer rotor of the generator according to the relationship between the enhanced grayscale and the preset threshold. First, the gradient direction may be approximated to one of four candidate angles (which are 0 degree, 45 degrees, 90 degrees, and 135 degrees generally), and then non-maximum suppression is performed to pre-exclude non-edge pixels. Afterwards, the edge pixel may be determined according to a relationship between a grayscale of a pixel that is not excluded and a first threshold and a second threshold.

In an embodiment of the present disclosure, a pixel with an enhanced grayscale greater than the first threshold value may be determined as the edge pixel of the blades of the wind turbine and the outer rotor of the generator. A pixel with an enhanced grayscale smaller than the second threshold may be determined as a non-edge pixel of the blades of the wind turbine and the outer rotor of the generator. A pixel that is adjacent to a determined edge pixel and with an enhanced grayscale greater than the second threshold and less than the first threshold may be determined as the edge pixel of the blades of the wind turbine and the outer rotor of the generator. A pixel that is not adjacent to a determined edge pixel and with an enhanced grayscale greater than the second threshold and less than the first threshold may be determined as a non-edge pixel of the blades of the wind turbine and the outer rotor of the generator.

In an embodiment of the present disclosure, when performing the contour detection on the grayscale image of the blades of the wind turbine and the outer rotor of the generator according to the result of the edge detection, least square curve-fitting may be performed on the edge pixels of the blades of the wind turbine and the outer rotor of the generator that are determined in the edge detection.

In step S103, a center line of the wind turbine is calculated according to the contour of the outer rotor of the generator and a contour of two blades in the blades of the wind turbine.

Figure 3:
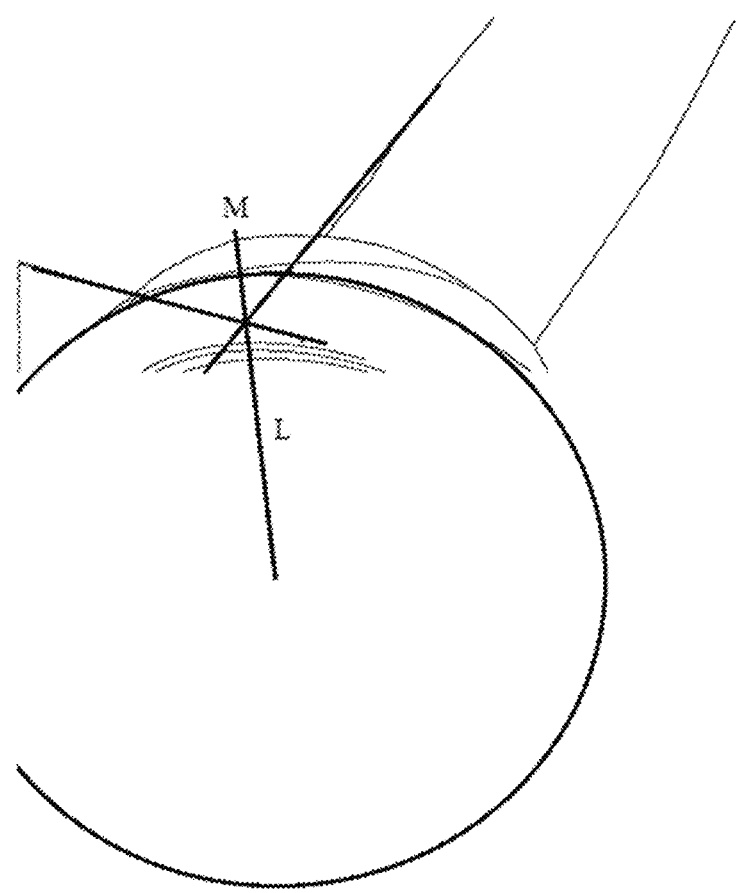
FIG. 3 is a schematic diagram of a center line of a wind turbine, and an intersection point between the center line of a wind turbine and a contour of an outer rotor of a generator according to an embodiment of the present disclosure.

In an embodiment of the present disclosure, following steps may be performed when calculating the center line of the wind turbine. First, edge lines in the contour of the two blades in the wind turbine may be extended, to obtain an intersection point between the extended edge lines. Then, the intersection point between the extended edge lines and a center point of the contour of the outer rotor of the generator are connected, so as to obtain the center line of the wind turbine. Reference is made to FIG. 3.

Figure 9:
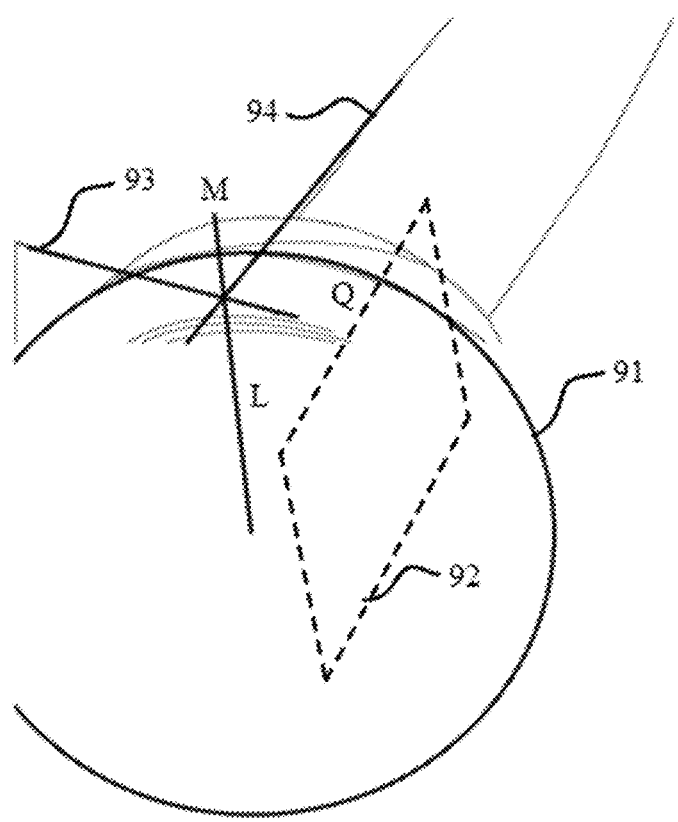
FIG. 9 is a schematic diagram illustrating an orienting plane of the wind vane according to an embodiment of the present disclosure.

FIG. 3 is a schematic diagram illustrating a center line of a wind turbine, and an intersection point between the center line of a wind turbine and a contour of an outer rotor of a generator according to an embodiment of the present disclosure. FIG. 3 shows connecting the intersection point between extended edge lines and the center point of the contour of the outer rotor of the generator, to obtain the center line L of the wind turbine. Reference is made to FIG. 9, where the edge lines in the contour of the two blades refer to two adjacent edge lines 93 and 94 in the contour of the two blades.

In step S104, an intersection point between the center line of the wind turbine and the contour of the outer rotor of the generator is obtained as a first intersection point.

Referring to FIG. 3, an intersection point M between the center line L of the wind turbine and the contour of the outer rotor of the generator is obtained as the first intersection point, after the center line L of the wind turbine is calculated.

In step S105, an orienting plane of the wind vane is obtained.

In an embodiment of the present disclosure, following steps may be performed when obtaining the orienting plane of the wind vane. First, a result of laser orientation on the wind vane may be obtained. Then, the orienting plane of the wind vane is determined according to the result of the laser orientation.

In step S106, it is determined whether the wind vane is aligned with the center line of the wind turbine, according to the center line of the wind turbine and the orienting plane of the wind vane. The flow goes to step S108, in a case that the wind vane is aligned with the center line of the wind turbine. The flow goes to step S107, in a case that the wind is not aligned with the center line of the wind turbine.

Hereinafter determining whether the wind vane is aligned with the center line of the wind turbine refers to determining whether the center axis 110 of the wind vane is parallel with the center line 12 of the wind turbine.

In an embodiment of the present disclosure, the determination may be based on whether the center line of the wind turbine is parallel with the orienting plane of the wind vane, when determining whether the wind vane is aligned with the center line of the wind turbine. In a case that the center line of the wind turbine is parallel with the orienting plane of the wind vane, it is determined that the wind vane is aligned with the center line of the wind turbine. In a case that the center line of the wind turbine is not parallel with the orienting plane of the wind vane, it is determined that the wind vane is not aligned with the center line of the wind turbine. In addition, the determination may be based on a distance between the intersection point between the center line of the wind turbine and the contour of the outer rotor of the generator and an intersection point between the orienting plane of the wind vane and the contour of the outer rotor of the generator, when determining whether the wind vane is aligned with the center line of the wind turbine. Further, it may be determined based on another method whether the wind vane is aligned with the center line of the wind turbine.

In step S107, it is determined that the wind vane is not aligned with the center line of the wind turbine, a deviation angle between the wind vane and the center line of the wind turbine is calculated based on the orienting plane of the wind vane and the first intersection point, and a direction of the wind vane is corrected according to the deviation angle between the wind vane and the center line of the wind turbine.

In an embodiment of the present disclosure, following steps may be performed when calculating the deviation angle between the wind vane and the center line of the wind turbine based on the orienting plane of the wind vane and the first intersection point. First, a distance represented by each pixel in the image of the blades of the wind turbine and the outer rotor of the generator may be calculated. Then, a deviation distance between the wind vane and the center line of the wind turbine, corresponding to each angle degree of the deviation angle, is calculated. Finally, the deviation angle between the wind vane and the center line of the wind turbine is calculated, according to the distance represented by each pixel in the image of the blades of the wind turbine and the outer rotor of the generator and the deviation distance that is between the wind vane and the center line of the wind turbine and corresponds to each angle degree of the deviation angle.

In an embodiment of the present disclosure, a sequence of calculating the distance represented by each pixel in the image of the blades of the wind turbine and the outer rotor of the generator and calculating the deviation distance between the wind vane and the center line of the wind turbine that corresponds to each angle degree of the deviation angle is not limited. As described above, the distance represented by each pixel in the image of the blades of the wind turbine and the outer rotor of the generator may be first calculated, and then the deviation distance between the wind vane and the center line of the wind turbine that corresponds to each angle degree of the deviation angle is calculated. Or, the deviation distance between the wind vane and the center line of the wind turbine that corresponds to each angle degree of the deviation angle may be first calculated, and then the distance represented by each pixel in the image of the blades of the wind turbine and the outer rotor of the generator is calculated. Alternatively, the two are simultaneously calculated.

Reference is made to FIG. 9. In an embodiment of the present disclosure, following steps may be performed when calculating the deviation angle between the wind vane and the center line of the wind turbine based on the orienting plane of the wind vane 92 and the first intersection point. First, an intersection point Q between the orienting plane of the wind vane and the contour 91 of the outer rotor of the generator may be obtained as a second intersection point. Then, a quantity of pixels between the first intersection point and the second intersection point are calculated in the image of the blades of the wind turbine and the outer rotor of the generator. Further, a distance represented by each pixel in the image of the blades of the wind turbine and the outer rotor of the generator is calculated, according to a width of a view field of the image collecting apparatus and a quantity of pixels along a width direction of the image of the blades of the wind turbine and the outer rotor of the generator. Afterwards, a deviation distance, between the wind vane and the center line of the wind turbine, corresponding to each angle degree of the deviation angle, is calculated according to a distance between the image collecting apparatus and the outer rotor of the generator, which is obtained through ultrasonic distance measurement. Finally, the deviation angle between the wind vane and the center line of the wind turbine is calculated, according to the distance represented by each pixel in the image of the blades of the wind turbine and the outer rotor of the generator and the deviation distance between the wind vane and the center line of the wind turbine that corresponds to each angle degree of the deviation angle.

For example, the image collecting apparatus is a camera. For calculating the distance represented by each pixel in the image of the blades of the wind turbine and the outer rotor of the generator, a width of a view field of the camera is 5 m, and a quantity of pixels along a width direction of the image of the blades of the wind turbine and the outer rotor of the generator is 1920. In such case, the distance represented by each pixel in the image of the blades of the wind turbine and the outer rotor of the generator is equal to 500 cm/1920, that is, 0.26 cm.

For example, a distance from the camera to the outer rotor of the generator is 4 m, for calculating the deviation distance between the wind vane and the center line of the wind turbine that corresponds to each angle degree of the deviation angle. In such case, the deviation distance between the wind vane and the center line of the wind turbine that corresponds to each angle degree of the deviation angle is equal to 400 cm×tan(1°), that is, 6.98 cm.

In an embodiment of the present disclosure, following steps may be performed when calculating the deviation angle between the wind vane and the center line of the wind turbine. First, a quantity of pixels for each angle degree in deviation of the wind vane in the image of the blades of the wind turbine and the outer rotor of the generator may be calculated, according to the distance represented by each pixel in the image of the blades of the wind turbine and the outer rotor of the generator and the deviation distance between the wind vane and the center line of the wind turbine that corresponds to each angle degree of the deviation angle. Then, the deviation angle between the wind vane and the center line of the wind turbine is calculated according to the quantity of pixels for deviation of the wind vane and the quantity of pixels for each angle degree in the deviation of the wind vane, in the image of the blades of the wind turbine and the outer rotor of the generator.

For example, the distance represented by each pixel in the image of the blades of the wind turbine and the outer rotor of the generator is 0.26 cm, and the deviation distance between the wind vane and the center line of the wind turbine that corresponds to each angle degree of the deviation angle is 6.98 cm. Thereby, the quantity pixels for each angle degree deviation of the wind vane in the image of the blades of the wind turbine and the outer rotor of the generator is 27. In a case that the quantity of the pixels for deviation of the wind vane in the image of the blades of the wind turbine and the outer rotor of the generator is 54, the deviation angle between the wind vane and the center line of the wind turbine is 2°.

In step S108, the flow of correcting the installation error of the wind vane is terminated, in a case that the wind vane is aligned with the center line of the wind turbine.

The method for collecting the installation error of the wind vane is provided according to embodiments of the present disclosure. First, the image of the blades of the wind turbine and the outer rotor of the generator is obtained. Then, it is determined whether the wind vane is aligned with the center line of the wind turbine, according to a relationship between the center line of the wind turbine and the orienting plane of the wind vane in the image. In a case that the wind vane is not aligned with the center line of the wind turbine, the deviation angle between the wind vane and the center line of the wind turbine is calculated, and a direction of the wind vane is corrected according to the deviation angle between the wind vane and the center line of the wind turbine. Therefore, installation errors of the wind vane are accurately determined and corrected, and accuracy is improved for installation of the wind vane.

Hereinabove the method for correcting the installation error of the wind vane is provided in conjunction with FIGS. 1 to 3 according to an embodiment of the present disclosure. Hereinafter an apparatus for correcting an installation error of a wind vane is provided according to an embodiment of the present disclosure, with reference to FIG. 4.

Figure 4:
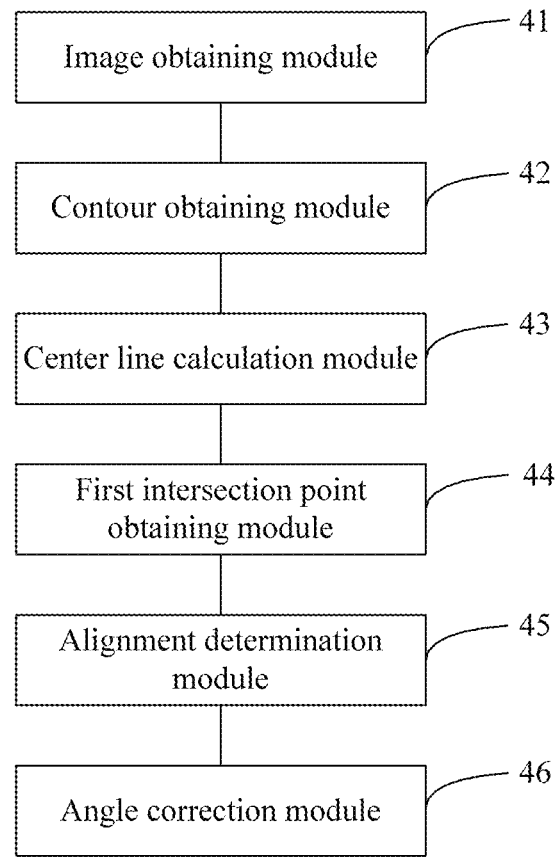
FIG. 4 is a block diagram of an apparatus for correcting an installation error of a wind vane according to an embodiment of the present disclosure.

FIG. 4 is a block diagram of an apparatus for correcting an installation error of a wind vane according to an embodiment of the present disclosure.

Referring to FIG. 4, an apparatus for correcting an installation error of a wind vane includes: an image obtaining module 41, a contour obtaining module 42, a center line calculation module 43, a first intersection point obtaining module 44, an alignment determination module 45, and an angle correction module 46.

The image obtaining module 41 is configured to obtain an image of blades of the wind turbine and an outer rotor of a generator.

In an embodiment of the present disclosure, the image of the blades of the wind turbine and the outer rotor of the generator may be acquired by an image collecting apparatus fixed on the wind vane. The image collecting apparatus may be fixed at a head of the wind vane. The image of the blades of the wind turbine and the outer rotor of the generator acquired by the image collecting apparatus at least includes a part of at least two blades in the blades of the wind turbine and a part of the outer rotor of the generator outer. For example, the image includes two blades in the blades of the wind turbine and an upper half of the outer rotor of the generator, or a part of the two blades and a part of the outer rotor of the generator that is close to the two blades.

The contour obtaining module 42 is configured to obtain a contour of the blades of the wind turbine and a contour of the outer rotor of the generator, from the image of the blades of the wind turbine and the outer rotor of the generator.

The image of the blades of the wind turbine and the outer rotor of the generator acquired by the image collecting apparatus may contain unwanted background interference information, such as sky and trees. Embodiments of the present disclosure focus mainly on the blades of the wind turbine and the outer rotor of the generator. Therefore, an originally acquired image of the blades of the wind turbine and the outer rotor of the generator should be processed to extract a target object that is to be measured, that is, the blades of the wind turbine and the outer rotor of the generator.

In an embodiment of the present disclosure, the contour obtaining module 42 is configured to perform following operations. A grayscale image of the blades of the wind turbine and the outer rotor of the generator is obtained according to the image of the blades of the wind turbine and the outer rotor of the generator. Edge detection is performed on the grayscale image of the blades of the wind turbine and the outer rotor of the generator. Contour detection is performed on the grayscale image of the blades of the wind turbine and the outer rotor of the generator, according to a result of the edge detection.

In an embodiment of the present disclosure, the edge detection may be performed based on a first derivative (or gradient magnitude) and a second derivative (or gradient magnitude) of grayscales of pixels in the grayscale image. Generally, the derivatives (or the gradient magnitudes) are sensitive to noise, which reduces accuracy of the result of the edge detection.

Therefore, in an embodiment of the present disclosure, the contour obtaining module 42 is configured to perform following operations, when performing edge detection on the grayscale image of the blades of the wind turbine and the outer rotor of the generator. First, the grayscale image of the blades of the wind turbine and the outer rotor of the generator is denoised through a Gaussian filter. Then, gradient magnitude of a grayscale of each pixel in the grayscale image is calculated after the de-noising. Preset enhancement is performed on the grayscale of each pixel according to the gradient magnitude. Finally, an edge pixel of the blades of the wind turbine and the outer rotor of the generator is determined according to a relationship between the enhanced grayscale and a preset threshold.

In an embodiment of the present disclosure, the contour obtaining module 42 is configured to perform following operations, when denoising the grayscale image of the blades of the wind turbine and the outer rotor of the generator through the Gaussian filter. First a discretized Gaussian function is used to generate a set of normalized Gaussian kernels, and then weighted sum is performed on all points of an image gray matrix based on a Gaussian kernel function.

In an embodiment of the present disclosure, the contour obtaining module 42 is configured to perform following operations, when determining the edge pixel of the blades of the wind turbine and the outer rotor of the generator according to the relationship between the enhanced grayscale and the preset threshold. First, the gradient direction may be approximated to one of four candidate angles (which are 0 degree, 45 degrees, 90 degrees, and 135 degrees generally), and then non-maximum suppression is performed to pre-exclude non-edge pixels. Afterwards, the edge pixel may be determined according to a relationship between a grayscale of a pixel that is not excluded and a first threshold and a second threshold.

In an embodiment of the present disclosure, the contour obtaining module 42 is configured to perform following operations. A pixel with an enhanced grayscale greater than the first threshold value is determined to be the edge pixel of the blades of the wind turbine and the outer rotor of the generator. A pixel with an enhanced grayscale smaller than the second threshold is determined not to be the edge pixel of the blades of the wind turbine and the outer rotor of the generator. A pixel that is adjacent to a determined edge pixel and with an enhanced grayscale greater than the second threshold and less than the first threshold is determined to be the edge pixel of the blades of the wind turbine and the outer rotor of the generator. A pixel that is not adjacent to a determined edge pixel and with an enhanced grayscale greater than the second threshold and less than the first threshold is determined not to be the edge pixel of the blades of the wind turbine and the outer rotor of the generator.

In an embodiment of the present disclosure, the contour obtaining module 42 is configured to perform a following operation, when performing the contour detection on the grayscale image of the blades of the wind turbine and the outer rotor of the generator according to the result of the edge detection. Least square curve-fitting is performed on the edge pixels of the blades of the wind turbine and the outer rotor of the generator that are determined in the edge detection.

The center line calculation module 43 is configured to calculate a center line of the wind turbine, according to the contour of the outer rotor of the generator and a contour of two blades in the blades of the wind turbine.

In an embodiment of the present disclosure, the center line calculation module 43 is configured to perform following steps, when calculating the center line of the wind turbine. First, edge lines in the contour of the two blades in the wind turbine may be extended, to obtain an intersection point between the extended edge lines. Then, the intersection point between the extended edge lines and a center point of the contour of the outer rotor of the generator are connected, so as to obtain the center line of the wind turbine.

The first intersection point obtaining module 44 is configured to obtain an intersection point between the center line of the wind turbine and the contour of the outer rotor of the generator, as a first intersection point.

The alignment determination module 45 is configured to obtain an orienting plane of the wind vane, and determine whether the wind vane is aligned with the center line of the wind turbine according to the center line of the wind turbine and the orienting plane of the wind vane.

In an embodiment of the present disclosure, the alignment determination module 45 is configured to perform following operations, when obtaining the orienting plane of the wind vane. First, a result of laser orientation on the wind vane may be obtained. Then, the orienting plane of the wind vane is determined according to the result of the laser orientation.

In an embodiment of the present disclosure, the alignment determination module 45 may determine based on whether the center line of the wind turbine is parallel with the orienting plane of the wind vane, when determining whether the wind vane is aligned with the center line of the wind turbine. In a case that the center line of the wind turbine is parallel with the orienting plane of the wind vane, it is determined that the wind vane is aligned with the center line of the wind turbine. In a case that the center line of the wind turbine is not parallel with the orienting plane of the wind vane, it is determined that the wind vane is not aligned with the center line of the wind turbine. In addition, the alignment determination module 45 may determine based on a distance between the intersection point between the center line of the wind turbine and the contour of the outer rotor of the generator and an intersection point between the orienting plane of the wind vane and the contour of the outer rotor of the generator, when determining whether the wind vane is aligned with the center line of the wind turbine. Further, it may be determined based on another method whether the wind vane is aligned with the center line of the wind turbine.

The angle correction module 46 is configured to determine that the wind vane is not aligned with the center line of the wind turbine, calculate a deviation angle between the wind vane and the center line of the wind turbine based on the orienting plane of the wind vane and the first intersection point, and correct a direction of the wind vane according to the deviation angle between the wind vane and the center line of the wind turbine.

In an embodiment of the present disclosure, the angle correction module 46 is configured to perform following operations, when calculating the deviation angle between the wind vane and the center line of the wind turbine based on the orienting plane of the wind vane and the first intersection point. First, a distance represented by each pixel in the image of the blades of the wind turbine and the outer rotor of the generator is calculated. Then, a deviation distance between the wind vane and the center line of the wind turbine, corresponding to each angle degree of the deviation angle, is calculated. Finally, the deviation angle between the wind vane and the center line of the wind turbine is calculated, according to the distance represented by each pixel in the image of the blades of the wind turbine and the outer rotor of the generator and the deviation distance that is between the wind vane and the center line of the wind turbine and corresponds to each angle degree of the deviation angle.

In an embodiment of the present disclosure, a sequence of calculating the distance represented by each pixel in the image of the blades of the wind turbine and the outer rotor of the generator and calculating the deviation distance between the wind vane and the center line of the wind turbine that corresponds to each angle degree of the deviation angle is not limited for the angle correction module 46. As described above, the distance represented by each pixel in the image of the blades of the wind turbine and the outer rotor of the generator may be first calculated, and then the deviation distance between the wind vane and the center line of the wind turbine that corresponds to each angle degree of the deviation angle is calculated. Or, the deviation distance between the wind vane and the center line of the wind turbine that corresponds to each angle degree of the deviation angle may be first calculated, and then the distance represented by each pixel in the image of the blades of the wind turbine and the outer rotor of the generator is calculated. Alternatively, the two are simultaneously calculated.

In an embodiment of the present disclosure, the angle correction module 46 is configured to perform following operations, when calculating the deviation angle between the wind vane and the center line of the wind turbine based on the orienting plane of the wind vane and the first intersection point. First, an intersection point between the orienting plane of the wind vane and the contour of the outer rotor of the generator is obtained as a second intersection point. Then, a quantity of pixels between the first intersection point and the second intersection point are calculated in the image of the blades of the wind turbine and the outer rotor of the generator. Further, a distance represented by each pixel in the image of the blades of the wind turbine and the outer rotor of the generator is calculated, according to a width of a view field of the image collecting apparatus and a quantity of pixels along a width direction of the image of the blades of the wind turbine and the outer rotor of the generator. Afterwards, a deviation distance, between the wind vane and the center line of the wind turbine, corresponding to each angle degree of the deviation angle, is calculated according to a distance between the image collecting apparatus and the outer rotor of the generator, which is obtained through ultrasonic distance measurement. Finally, the deviation angle between the wind vane and the center line of the wind turbine is calculated, according to the distance represented by each pixel in the image of the blades of the wind turbine and the outer rotor of the generator and the deviation distance between the wind vane and the center line of the wind turbine that corresponds to each angle degree of the deviation angle.

In an embodiment of the present disclosure, the angle correction module 46 is configured to perform following operations, when calculating the deviation angle between the wind vane and the center line of the wind turbine. First, a quantity of pixels for each angle degree in deviation of the wind vane in the image of the blades of the wind turbine and the outer rotor of the generator may be calculated, according to the distance represented by each pixel in the image of the blades of the wind turbine and the outer rotor of the generator and the deviation distance between the wind vane and the center line of the wind turbine that corresponds to each angle degree of the deviation angle. Then, the deviation angle between the wind vane and the center line of the wind turbine is calculated according to the quantity of pixels for deviation of the wind vane and the quantity of pixels for each angle degree in the deviation of the wind vane, in the image of the blades of the wind turbine and the outer rotor of the generator.

In an embodiment of the present disclosure, correcting the installation error of the wind vane is terminated, in a case that the wind vane is aligned with the center line of the wind turbine.

The apparatus for collecting the installation error of the wind vane is provided according to embodiments of the present disclosure. First, the image of the blades of the wind turbine and the outer rotor of the generator is obtained. Then, it is determined whether the wind vane is aligned with the center line of the wind turbine, according to a relationship between the center line of the wind turbine and the orienting plane of the wind vane in the image. In a case that the wind vane is not aligned with the center line of the wind turbine, the deviation angle between the wind vane and the center line of the wind turbine is calculated, and a direction of the wind vane is corrected according to the deviation angle between the wind vane and the center line of the wind turbine. Therefore, installation errors of the wind vane are accurately determined and corrected, and accuracy is improved for installation of the wind vane.

A computer-readable storage medium is further provided according to an embodiment of the present disclosure. The computer-readable storage medium stores a computer program. The computer program when executed implements the method for correcting the installation error of the wind vane according to embodiments of the present disclosure.

As an example, the program when executed may implement following steps. An image, of blades of a wind turbine and an outer rotor of a generator, is obtained. A contour of the blades of the wind turbine and a contour of the outer rotor of the generator are obtained from the image of the blades of the wind turbine and the outer rotor of the generator. A center line of the wind turbine is calculated according to the contour of the outer rotor of the generator and a contour of two blades in the blades of the wind turbine. An intersection point between the center line of the wind turbine and the contour of the outer rotor of the generator is obtained as a first intersection point. An orienting plane of the wind vane is obtained, and it is determined whether the wind vane is aligned with the center line of the wind turbine, according to the center line of the wind turbine and the orienting plane of the wind vane. In a case that the wind vane is not aligned with the center line of the wind turbine, a deviation angle between the wind vane and the center line of the wind turbine is calculated based on the orienting plane of the wind vane and the first intersection point, and a direction of the wind vane is corrected according to the deviation angle between the wind vane and the center line of the wind turbine.

Hereinafter a computing apparatus according to an embodiment of the present disclosure is described in conjunction with FIG. 5.

Figure 5:
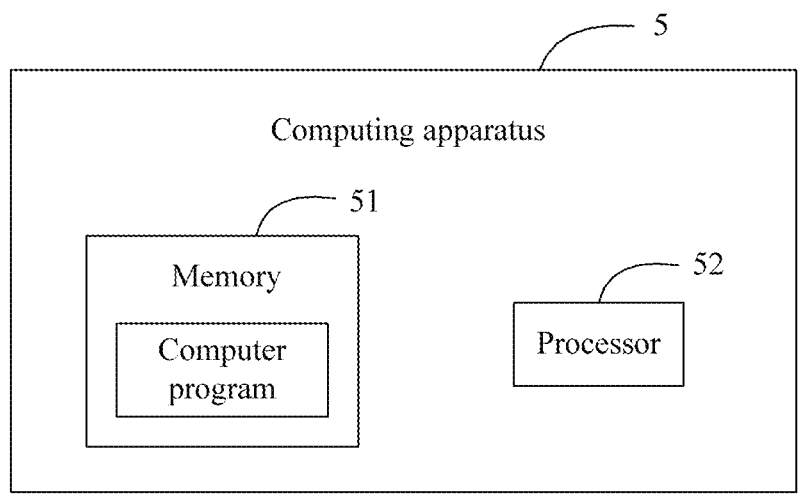
FIG. 5 is a block diagram of a computing apparatus according to an embodiment of the present disclosure.

FIG. 5 is a block diagram of a computing apparatus according to an embodiment of the present disclosure.

Referring to FIG. 5, a computing apparatus 5 according to an embodiment of the present disclosure includes: a memory 51, a processor 52 and a computer program. The computer program is stored in the memory and executable by the processor. The processor when executing the computer program implements the method for correcting the installation error of the wind vane according to embodiments of the present disclosure.

For example, the processor is configured to execute the program including following steps. An image, of blades of a wind turbine and an outer rotor of a generator, is obtained. A contour of the blades of the wind turbine and a contour of the outer rotor of the generator are obtained from the image of the blades of the wind turbine and the outer rotor of the generator. A center line of the wind turbine is calculated according to the contour of the outer rotor of the generator and a contour of two blades in the blades of the wind turbine. An intersection point between the center line of the wind turbine and the contour of the outer rotor of the generator is obtained as a first intersection point. An orienting plane of the wind vane is obtained, and it is determined whether the wind vane is aligned with the center line of the wind turbine, according to the center line of the wind turbine and the orienting plane of the wind vane. In a case that the wind vane is not aligned with the center line of the wind turbine, a deviation angle between the wind vane and the center line of the wind turbine is calculated based on the orienting plane of the wind vane and the first intersection point, and a direction of the wind vane is corrected according to the deviation angle between the wind vane and the center line of the wind turbine.

Hereinabove the method and apparatus for correcting an installation error of a wind vane according to embodiments of the present disclosure are described with reference to FIGS. 1 to 5. The apparatus for correcting the installation error of the wind vane as shown in FIG. 4 and the modules thereof may be software, hardware, firmware, or any combination thereof, for performing specific functions. The computing apparatus as shown in FIG. 5 is not limited to the forgoing components, where some components may be added or deleted as needed, and the forgoing components may further be combined.

The method and the apparatus for collecting the installation error of the wind vane are provided according to embodiments of the present disclosure. The image of the blades of the wind turbine and the outer rotor of the generator is obtained. It is determined whether the wind vane is aligned with the center line of the wind turbine, according to a relationship between the center line of the wind turbine and the orienting plane of the wind vane in the image. In a case that the wind vane is not aligned with the center line of the wind turbine, the deviation angle between the wind vane and the center line of the wind turbine is calculated, and a direction of the wind vane is corrected according to the deviation angle between the wind vane and the center line of the wind turbine. Therefore, installation errors of the wind vane are accurately determined and corrected, and accuracy is improved for installation of the wind vane.

Although the present disclosure has been shown and described in details with reference to embodiments, those skilled in the art should understand that various changes may be made to the forms and details of the present disclosure without departing from the spirit and scope of the present disclosure as defined by the claims.

The invention claimed is:

1. A method for correcting an installation error of a wind vane, comprising:
obtaining an image, of blades of a wind turbine and an outer rotor of a generator;
obtaining a contour of the blades of the wind turbine and a contour of the outer rotor of the generator, from the image of the blades of the wind turbine and the outer rotor of the generator;
calculating a center line of the wind turbine, according to the contour of the outer rotor of the generator and a contour of two blades in the blades of the wind turbine;
obtaining an intersection point between the center line of the wind turbine and the contour of the outer rotor of the generator, as a first intersection point;
obtaining an orienting plane of the wind vane;
determining whether the wind vane is aligned with the center line of the wind turbine, according to the center line of the wind turbine and the orienting plane of the wind vane; and
in a case that the wind vane is not aligned with the center line of the wind turbine:
calculating a deviation angle between the wind vane and the center line of the wind turbine, based on the orienting plane of the wind vane and the first intersection point, and
correcting a direction of the wind vane, according to the deviation angle between the wind vane and the center line of the wind turbine.

2. The method according to claim 1, wherein obtaining the contour of the blades of the wind turbine and the contour of the outer rotor of the generator from the image of the blades of the wind turbine and the outer rotor of the generator comprises:
obtaining a grayscale image of the blades of the wind turbine and the outer rotor of the generator, according to the image of the blades of the wind turbine and the outer rotor of the generator;
performing edge detection on the grayscale image; and
performing contour detection on the grayscale image, according to a result of the edge detection.

3. The method according to claim 2, wherein performing the edge detection on the grayscale image of the blades of the wind turbine and the outer rotor of the generator comprises:
denoising the grayscale image of the blades of the wind turbine and the outer rotor of the generator, through a Gaussian filter;
calculating gradient magnitude of a grayscale of each pixel in the grayscale image after the de-noising;
performing preset enhancement on the grayscale of each pixel, according to the gradient magnitude; and
determining an edge pixel of the blades of the wind turbine and the outer rotor of the generator, according to a relationship between the enhanced grayscale and a preset threshold.

4. The method according to claim 1, wherein obtaining the orienting plane of the wind vane comprises:
obtaining a result of laser orientation on the wind vane; and
determining the orienting plane of the wind vane according to the result of the laser orientation.

5. The method according to claim 1, wherein calculating the center line of the wind turbine comprises:
extending edge lines in the contour of the two blades of the wind turbine, to obtain an intersection point between the extended edge lines; and
connecting the intersection point between the extended edge lines, and a center point of the contour of the outer rotor of the generator, to obtain the center line of the wind turbine.

6. The method according to claim 1, wherein calculating the deviation angle between the wind vane and the center line of the wind turbine based on the orienting plane of the wind vane and the first intersection point comprises:
obtaining an intersection point between the orienting plane of the wind vane and the contour of the outer rotor of the generator, as a second intersection;
calculating a quantity of pixels, which are between the first intersection point and the second intersection point, in the image of the blades of the wind turbine and the outer rotor of the generator, wherein the image is obtained by an image collecting apparatus fixed on the wind vane, and the image collecting apparatus is fixed at a head of the wind vane;
calculating a distance represented by each pixel in the image, according to a width of a view field of the image collecting apparatus and a quantity of pixels along a width direction of the image;
calculating a deviation distance, between the wind vane and the center line of the wind turbine, corresponding to each angle degree of the deviation angle, according to a distance between the image collecting apparatus and the outer rotor of the generator, wherein the distance between the image collecting apparatus and the outer rotor of the generator is obtained through ultrasonic distance measurement; and
calculating the deviation angle between the wind vane and the center line of the wind turbine, according to the distance represented by each pixel in the image and the deviation distance corresponding to each angle degree.

7. An apparatus for correcting an installation error of a wind vane, comprising:
an image obtaining module, configured to obtain an image, of blades of a wind turbine and an outer rotor of a generator;
a contour obtaining module, configured to obtain a contour of the blades of the wind turbine and a contour of the outer rotor of the generator, from the image of the blades of the wind turbine and the outer rotor of the generator;
a center line calculation module, configured to calculate a center line of a wind turbine, according to the contour of the outer rotor of the generator and a contour of two blades in the blades of the wind turbine;
a first intersection point obtaining module, configured to obtain an intersection point between the center line of the wind turbine and the contour of the outer rotor of the generator, as a first intersection point;

an alignment determination module, configured to obtain an orienting plane of the wind vane, and determine whether the wind vane is aligned with the center line of the wind turbine, according to the center line of the wind turbine and the orienting plane of the wind vane; and an angle correction module, configured to:
determine that the wind vane is not aligned with the center line of the wind turbine,
calculate a deviation angle between the wind vane and the center line of the wind turbine based on the orienting plane of the wind vane and the first intersection point, and
correct a direction of the wind vane according to the deviation angle between the wind vane and the center line of the wind turbine.

8. The apparatus according to claim 7, wherein the contour obtaining module is configured to:
obtain a grayscale image of the blades of the wind turbine and the outer rotor of the generator, according to the image of the blades of the wind turbine and the outer rotor of the generator;
perform edge detection on the grayscale image; and
perform contour detection on the grayscale image, according to a result of the edge detection.

9. The apparatus according to claim 8, wherein the contour obtaining module is configured to:
denoise the grayscale image of the blades of the wind turbine and the outer rotor of the generator, through a Gaussian filter;
calculate gradient magnitude of a grayscale of each pixel in the grayscale image after the de-noising;
perform preset enhancement on the grayscale of each pixel, according to the gradient magnitude; and
determine an edge pixel of the blades of the wind turbine and the outer rotor of the generator, according to a relationship between the enhanced grayscale and a preset threshold.

10. The apparatus according to claim 7, wherein the alignment determination module is configured to:
obtain a result of laser orientation on the wind vane, and determine the orienting plane of the wind vane according to the result of the laser orientation.

11. The apparatus according to claim 7, wherein the center line calculation module is configured to:
extend edge lines in the contour of the two blades of the wind turbine, to obtain an intersection point between the extended edge lines; and
connect the intersection point between the extended edge lines, and a center point of the contour of the outer rotor of the generator, to obtain the center line of the wind turbine.

12. The apparatus according to claim 7, wherein the angle correction module is configured to:
obtain an intersection point between the orienting plane of the wind vane and the contour of the outer rotor of the generator, as a second intersection;
calculate a quantity of pixels, which are between the first intersection point and the second intersection point, in the image of the blades of the wind turbine and the outer rotor of the generator, wherein the image is obtained by an image collecting apparatus fixed on the wind vane, and the image collecting apparatus is fixed at a head of the wind vane;
calculate a distance represented by each pixel in the image, according to a width of a view field of the image collecting apparatus and a quantity of pixels along a width direction of the image;
calculate a deviation distance, between the wind vane and the center line of the wind turbine, corresponding to each angle degree of the deviation angle, according to a distance between the image collecting apparatus and the outer rotor of the generator, wherein the distance between the image collecting apparatus and the outer rotor of the generator is obtained through ultrasonic distance measurement; and
calculate the deviation angle between the wind vane and the center line of the wind turbine, according to the distance represented by each pixel in the image and the deviation distance corresponding to each angle degree.

13. A computer-readable storage medium, storing a computer program, wherein the computer program when executed implements the method for correcting the installation error of the wind vane according to claim 1.

14. A computing apparatus, comprising:
a memory,
a processor, and
a computer program stored in the memory and executable by the processor,
wherein the processor when executing the computer program implements the method for correcting the installation error of the wind vane according to claim 1.

15. A system for correcting an installation error of a wind vane of a wind turbine, wherein:
the wind turbine comprises a nacelle, a wheel hub, a generator and a wind vane, the wheel hub comprises three blades, the generator is disposed between the nacelle and the wheel hub, the wind vane is disposed on top of the nacelle, and a head of the wind vane points toward the wheel hub;
the system comprises:
an image collecting apparatus, detachably disposed at the head of the wind vane, wherein the image collecting apparatus is configured to acquire an image of blades of the wind turbine and an outer rotor of the generator; and
a processor, in communications connection with the image collecting apparatus; and
the processor is configured to:
obtain the image of blades of the wind turbine and the outer rotor of the generator;
obtain a contour of the blades of the wind turbine and a contour of the outer rotor of the generator, from the image of the blades of the wind turbine and the outer rotor of the generator;
calculate a center line of a wind turbine, according to the contour of the outer rotor of the generator and a contour of two blades in the blades of the wind turbine;
obtain an intersection point between the center line of the wind turbine and the contour of the outer rotor of the generator, as a first intersection point;
obtain an orienting plane of the wind vane, and determine whether the wind vane is aligned with the center line of the wind turbine, according to the center line of the wind turbine and the orienting plane of the wind vane; and
determine that the wind vane is not aligned with the center line of the wind turbine, calculate a deviation angle between the wind vane and the center line of the wind turbine based on the orienting plane of the wind vane and the first intersection point, and correct a direction of the wind vane according to the deviation angle between the wind vane and the center line of the wind turbine.

16. The system according to claim 15, wherein the processor is further configured to:
    obtain a grayscale image of the blades of the wind turbine and the outer rotor of the generator, according to the image of the blades of the wind turbine and the outer rotor of the generator;
    perform edge detection on the grayscale image; and
    perform contour detection on the grayscale image, according to a result of the edge detection.

17. The system according to claim 16, wherein the processor is further configured to:
    denoise the grayscale image of the blades of the wind turbine and the outer rotor of the generator, through a Gaussian filter;
    calculate gradient magnitude of a grayscale of each pixel in the grayscale image after the de-noising;
    perform preset enhancement on the grayscale of each pixel, according to the gradient magnitude; and
    determine an edge pixel of the blades of the wind turbine and the outer rotor of the generator, according to a relationship between the enhanced grayscale and a preset threshold.

18. The system according to claim 15, further comprising a laser scanning apparatus,
    wherein the laser scanning apparatus is configured to scan the wind vane and a rotating shaft, and collect data of the orienting plane of the wind vane; and
    wherein the processor is further configured to:
        obtain a result of laser orientation on the wind vane, and
        determine the orienting plane of the wind vane according to the result of the laser orientation.

19. The system according to claim 15, wherein the processor is further configured to:
    extend edge lines in the contour of the two blades of the wind turbine, to obtain an intersection point between the extended edge lines; and
    connect the intersection point between the extended edge lines, and a center point of the contour of the outer rotor of the generator, to obtain the center line of the wind turbine.

20. The system according to claim 15, wherein the processor is further configured to:
    obtain an intersection point between the orienting plane of the wind vane and the contour of the outer rotor of the generator, as a second intersection;
    calculate a quantity of pixels, which are between the first intersection point and the second intersection point, in the image of the blades of the wind turbine and the outer rotor of the generator;
    calculate a distance represented by each pixel in the image, according to a width of a view field of the image collecting apparatus and a quantity of pixels along a width direction of the image;
    calculate a deviation distance, between the wind vane and the center line of the wind turbine, corresponding to each angle degree of the deviation angle, according to a distance between the image collecting apparatus and the outer rotor of the generator, wherein the distance between the image collecting apparatus and the outer rotor of the generator is obtained through ultrasonic distance measurement; and
    calculate the deviation angle between the wind vane and the center line of the wind turbine, according to the distance represented by each pixel in the image and the deviation distance corresponding to each angle degree.

* * * * *